United States Patent [19]

Piper

[11] Patent Number: 5,058,789

[45] Date of Patent: Oct. 22, 1991

[54] SHOULDER CUSHION ATTACHMENT FOR LADDERS

[76] Inventor: William D. Piper, 1003 Lakecrest Rd., Lawrence, Kans. 66049

[21] Appl. No.: 557,576

[22] Filed: Jul. 24, 1990

[51] Int. Cl.$^5$ ............................................. B65G 7/00
[52] U.S. Cl. .................................... 224/265; 224/270; 224/907
[58] Field of Search ............... 224/265, 264, 907, 270, 224/271

[56] References Cited

U.S. PATENT DOCUMENTS

| | | | |
|---|---|---|---|
| 2,385,315 | 9/1945 | Vanasse | 224/264 |
| 4,754,858 | 7/1988 | Robinson | 224/264 |
| 4,871,102 | 10/1989 | Wickersham | 224/917 |
| 4,895,286 | 1/1990 | De Rosa | 224/265 |

Primary Examiner—Renee S. Luebke
Attorney, Agent, or Firm—Kokjer, Kircher, Bradley, Wharton, Bowman & Johnson

[57] ABSTRACT

A ladder attachment which cushions the shoulder of a person carrying the ladder. A foam cushion is bonded to a base which slips onto either side rail of the ladder. The base is shaped to mate with the channel shape of the ladder rail and has inturned lips on the edges of its sides which hook over the flange edges of the rail. A resilient foam pad is interposed between the base plate of the base and the channel web to apply a force which assures that the lips remain hooked on the flange edges.

8 Claims, 1 Drawing Sheet

SHOULDER CUSHION ATTACHMENT FOR LADDERS

BACKGROUND AND SUMMARY OF THE INVENTION

This invention relates generally to ladders and more particularly to a ladder attachment which facilitates carrying of a ladder on the shoulder.

Extension ladders and other types of ladders are notoriously difficult to carry from place to place, both because of their weight (up to 50 pounds) and because their length makes them awkward and cumbersome to handle. Aggravating this problem is the fact that the ladder is often needed in places that are rather inaccessible, and it is not uncommon for rough and/or hilly terrain to be encountered when carrying the ladder to and from its point of use.

Perhaps the most common technique used in carrying an extension ladder is to balance it on the shoulder and to then walk slowly and carefully to the desired location. Although this technique is better than others in many respects, it is not wholly satisfactory and can result in physical injuries. Probably the most notable problem is that the entire weight of the ladder is concentrated on the shoulder and is borne by the clavicle and surrounding tissue. Consequently, there is not only considerable discomfort to the shoulder area, but there is also a high incidence of physical injury to the shoulder, neck, back and arm areas, as well as aggravation of prior injuries to these areas. Properly balancing a lengthy ladder of the narrow fulcrum provided by the shoulder creates instability that can result in accidents. Additionally, the person carrying the ladder is likely to tire quickly and to devote more attention to enduring upper body discomfort and the unbalanced condition of the ladder than to walking carefully, thus increasing the chances of stumbling or another accident.

The present invention is directed to a ladder attachment that permits a ladder to be borne on the shoulder with more stability and less discomfort than has been possible in the past. Consequently, physical injury caused by the weight of the ladder and accidents due to instability of the ladder can be greatly reduced through use of the ladder attachment.

In accordance with the invention, a foam cushion is carried on a C shaped mounting base which may be attached to the side rail of a ladder. The mounting base includes a base plate and opposite sides which extend around the rail of the ladder. The sides of the base are provided on their free ends with inturned lips that hook to the free edges of the flanges of the rail. A compressible foam strip on the base plate applies a force that positively retains the lips against the flange edges in order to securely hold the base in place on the rail. The cushion is bonded to the base plate and extends between projecting ribs on the base.

Through use of the ladder attachment of the present invention, the shoulder is subjected to reduced stress due to the presence of the cushion, and the weight of the ladder is distributed over a larger surface area of the shoulder, thus enhancing the stability and reducing the concentration of the load. At the same time, the ladder can be used while the device remains in place on the side rail of the ladder, and the device does not inhibit the ability of the ladder to perform its intended function.

Other and further objects of the invention, together with the features of novelty appurtenant thereto, will appear in the course of the following description.

DESCRIPTION OF THE DRAWINGS

In the accompanying drawings which form a part of the specification and are to be read in conjunction therewith and in which like reference numerals are used to indicate like parts in the various views.

DETAILED DESCRIPTION OF THE INVENTION

Figures 1, 2, 3, 4:
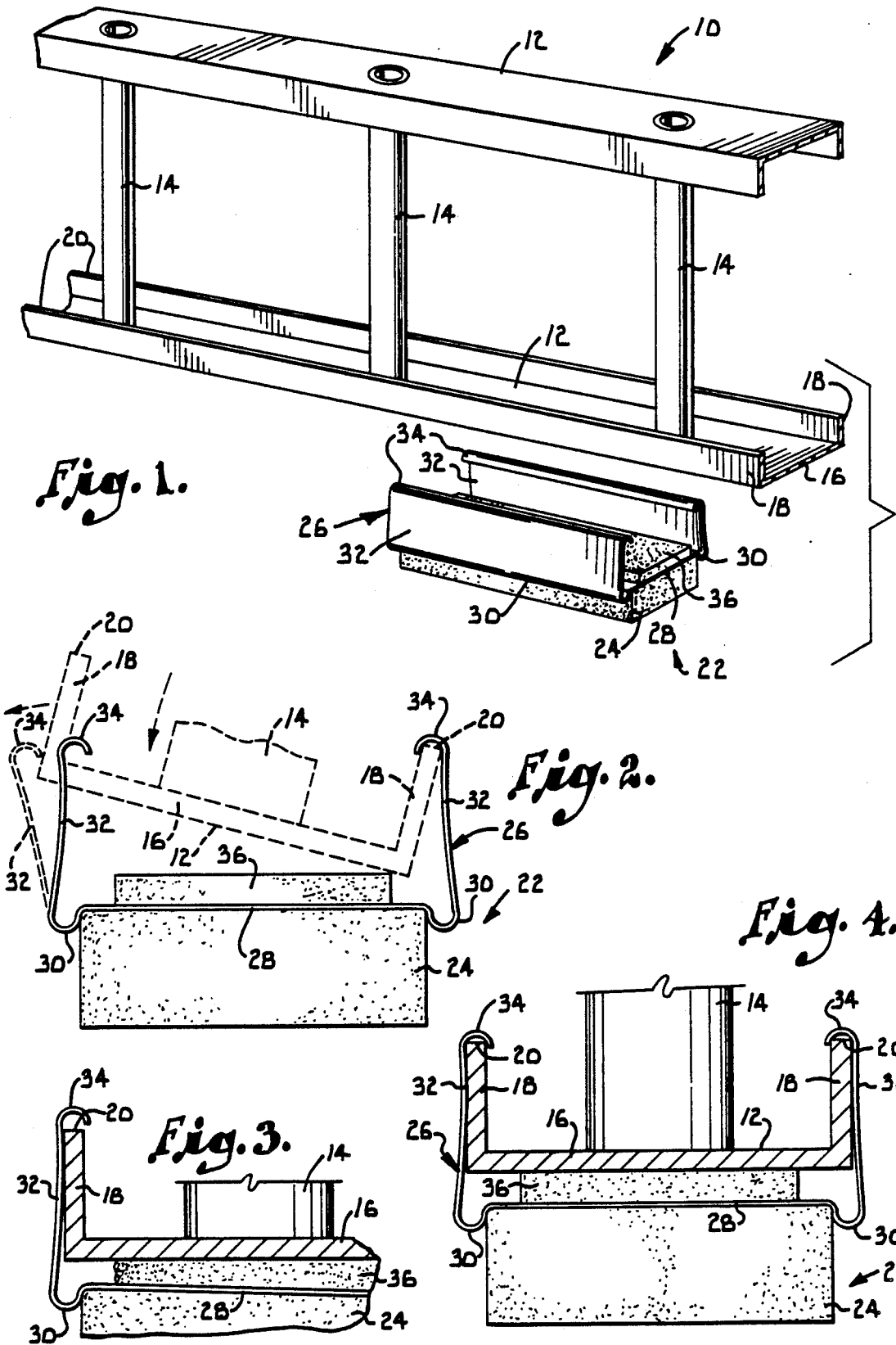
FIG. 1 is an exploded perspective view showing a fragment of an extension ladder and a ladder attachment constructed according to a preferred embodiment of the present invention.
FIG. 2 is an end elevational view of the ladder attachment on an enlarged scale, with the broken lines showing how the device is initially applied to one of the side rails of the ladder.
FIG. 3 is a fragmentary perspective view similar to FIG. 2, but showing the ladder attachment immediately after it has been snapped onto the side rail of the ladder.
FIG. 4 is a sectional view similar to FIGS. 2 and 3, but showing the ladder attachment fully in place on the ladder side rail.

Referring now to the drawings in more detail, numeral 10 generally designates a conventional ladder having a pair of parallel side rails 12 and a plurality of tubular rungs 14 which are connected to extend rigidly between the opposite rails 12. Each of the rails 12 is a channel member having a flat web 16 and parallel flanges 18 which extend from the opposite side edges of the web 16 and which terminate in free edges 20. The ladder 10 may be an extension ladder having two or more ladder sections that extend and retract relative to one another.

Numeral 22 generally designates an attachment which may be applied to the ladder 10 and which serves as a shoulder cushion to facilitate carrying of the ladder in accordance with the present invention. The ladder attachment 22 includes as its major components a rectangular cushion 24 and a mounting base which is generally identified by numeral 26. The cushion 24 is preferably constructed of a suitable foam material having the ability to serve as a cushion for the shoulder of a person carrying the ladder, as will be explained more fully. Preferably, the cushion 24 has the shape of a rectilinear block, and its thickness is sufficient to provide adequate cushioning for the shoulder.

The mounting base 26 serves to attach the cushion 24 to the ladder 10. The base 26 includes a flat base plate 28 which has a width slightly less than the width of the channel flange 16. At the opposite side edges of the base plate 28, the base 26 is curved to provide a pair of parallel ribs 30 which extend the length of the base and which project generally to one side of the base plate. The cushion 24 is adhesively bonded or otherwise suitably secured to the base plate 28 on the side from which the ribs 30 project. The cushion 24 extends between the two ribs 30 which function to assist in keeping the cushion seated on the base plate 28 and to provide protection against accidental dislodging of the cushion.

The mounting base 26 also includes generally parallel opposite sides 32 which extend from the respective ribs 30 and which project away from the base plate 28 in a direction opposite the extension of the ribs 30. The sides 32 are spaced apart from one another a distance slightly greater than the spacing between the two flanges 18 of each ladder rail 12. Each side 32 terminates in a free edge that is provided with an inturned lip 34 having a curved configuration and a shape to closely receive and hook onto the free edge 20 of the channel flange 18, as best shown in FIG. 4.

The base 26 is preferably formed as a single integral piece, and it may be constructed of a suitable metal, plastic or other material. The sides 32 should be capable of being flexed away from one another as shown in broken lines in FIG. 2, and they should resist such flexure and snap back toward one another as shown in FIG. 4 as soon as the force that displaces them is removed.

The surface of the base plate 28 opposite the surface that carries the foam pad 24 is provided with a compressible foam strip 36. The strip 36 may be constructed of the same material as the cushion 24, and it may be adhesively bonded or otherwise secured in place on the base plate 28. The strip 36 is resilient such that it exerts a force in opposition to forces which compress it.

In use, the ladder attachment 22 may be applied to either of the rails 12 and functions to provide a cushion for the shoulder of a person carrying the ladder. In order to apply the attachment 22 to the ladder, one of the lips 34 is initially hooked over the edge 20 of one flange 18 in the manner shown in broken lines in FIG. 2. The opposite side 32 is then pulled outwardly such that the corresponding lip 34 can clear the opposite flange 18, and the attachment 22 may then be forced onto the rail 12 such that the base plate 28 approaches the web 16 until the second lip 34 snaps past the edge 20 of the flange. This is the position shown in FIG. 3, and it is noted that the resilient foam strip 36 is compressed. The strip 36 resists compression, and, when the attachment 22 is released, the strip 36 expands in order to draw both of the lips 34 securely onto the edges 20 of the side rail flanges. This resilient force applied by the strip 36 secures the attachment 22 on the rail 12 and assures that the curved lips 34 remain hooked on the flange edges 20 as shown in FIG. 4.

The attachment 22 should be applied to the rail 12 at the midpoint of the ladder which is also its center of gravity. It is noted that the attachment 22 can be slid lengthwise along the rail 12 until it is in the proper position for good balance of the ladder. The base 26 mounts the cushion 24 on the outwardly facing surface of the rail 12 where the cushion is exposed and may be applied to the shoulder.

In order to carry the ladder from place to place, the ladder is then lifted and the cushion 24 is applied to either shoulder of the person carrying the ladder. The cushion 24 is soft enough to provide significant cushioning of the shoulder which greatly reduces the physical discomfort caused by the load that is borne by the shoulder, the clavicle and surrounding tissue. At the same time, the foam cushion 24 distributes the weight of the ladder over a relatively large area on the shoulder and thus reduces the concentration of the loading on the shoulder.

It is not worthy that the attachment 22 can remain in place when the ladder is being used and that the attachment does not detract from the ability of the ladder to function normally. The attachment 22 can be applied to either rail 12 of the ladder and can be removed simply by reversing the procedure used to apply it to the rail. However, it is contemplated that the attachment 22 will normally remain in place on the ladder where it is always available for use when needed. It is also contemplated that the attachment may be permanently secured in place on the ladder, and it should be noted that the attachment can be modified such that it can be mounted on ladder rails that differ from the channel shaped rails illustrated in the drawings. Such a modification is contemplated by the invention and is within its scope.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without department from the scope thereof, it is to be understood that all matter herein set forth or shown in the accompanying drawings is to be interpreted as illustrative and not in a limiting sense.

Having thus described the invention, I claim:

1. An attachment for a ladder having a plurality of rungs extending between a pair of rails each formed by a channel presenting a web and a pair of flanges each terminating in a free edge, said attachment comprising:
   a mounting base having a flat base plate and a pair of sides extending from said base plate, each side terminating in a curved lip;
   a cushion secured to said base plate;
   said base being applicable to either channel with said base plate spanning the web and said sides extending along the flanges, said curved lips being hooked onto and spanning the free edges of the flanges to secure the base on the channel at a location wherein the cushion is applicable to a shoulder of a person carrying the ladder on said shoulder.

2. In combination with a ladder having a pair of generally parallel rails and a plurality of rungs extending between the rails, a cushion attachment comprising:
   a cushion having a thickness to exhibit cushion properties; and
   a flat mounting base for said cushion, said base being mounted on one of the ladder rails and carrying said cushion thereon at a location to be applicable to a shoulder of a person carrying the ladder on the shoulder.

3. The attachment of claim 2, wherein:
   each of the rails has the form of a channel presenting a web and a pair of flanges projecting from the web and each terminating in a free edge;
   said base includes a base plate and a pair of sides extending from said base plate, each side terminating in an inturned lip having a curved shape; and
   said base is applied to each rail with said base plate spanning the web, said sides extending along the flanges, and said lips hooked onto and spanning the free edges of the flanges in a manner to retain the base on the rail.

4. The attachment of claim 3, including resilient means on said base plate for applying a force against the web in a manner to draw said lips toward the free edges of the channel to which the base is applied.

5. The attachment of claim 3, including a pair of ribs projecting from said base plate in a direction opposite said sides, said cushion being carried on said base plate and extending between said ribs.

6. An attachment for a ladder having weight and a plurality of rungs extending between a pair of rails each formed by a channel presenting a web and a pair of flanges each terminating in a free edge, said attachment comprising:
   a cushion;
   a mounting base carrying said cushion thereon and having a base plate and a pair of sides extending from said base plate, each side terminating in an inturned lip;
   said base being applicable to each channel with said base spanning the web and with said sides adjacent to the flanges and said lips hooked onto the free edges of the flanges to mount the cushion on said channel at a location to be applicable to a shoulder of a person carrying the ladder with the weight thereof borne on the shoulder; and
   resilient means on said base plate for applying a force to the web in a manner to urge said lips toward the free edges of the flanges.

7. The attachment of claim 6, wherein said cushion is bonded to said base plate.

8. The attachment of claim 6, including a pair of ribs projecting from said base plate, said cushion being carried on said base plate and extending between said ribs.

* * * * *